(12) United States Patent
Au et al.

(10) Patent No.: US 7,801,328 B2
(45) Date of Patent: Sep. 21, 2010

(54) METHODS FOR DEFINING, DETECTING, ANALYZING, INDEXING AND RETRIEVING EVENTS USING VIDEO IMAGE PROCESSING

(75) Inventors: KwongWing Au, Bloomington, MN (US); Keith L. Curtner, St. Paul, MN (US); Saad J. Bedros, West St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 1342 days.

(21) Appl. No.: 10/907,413

(22) Filed: Mar. 31, 2005

(65) Prior Publication Data

US 2006/0227997 A1 Oct. 12, 2006

(51) Int. Cl.
G06K 9/00 (2006.01)
G09G 5/00 (2006.01)
H04N 7/18 (2006.01)
H04N 5/225 (2006.01)

(52) U.S. Cl. .................. 382/103; 382/107; 348/143; 348/169; 345/156

(58) Field of Classification Search .............. 382/103, 382/106, 107, 224, 305, 181, 199; 345/156; 348/143, 169; 725/61, 93, 105, 116
See application file for complete search history.

(56) References Cited

U.S. PATENT DOCUMENTS

| 5,708,767 | A | | 1/1998 | Yeo et al. |
| 5,821,945 | A | | 10/1998 | Yeo et al. |
| 5,828,809 | A | | 10/1998 | Chang et al. |
| 5,867,584 | A | * | 2/1999 | Hu et al. ............... 382/103 |
| 5,969,755 | A | | 10/1999 | Courtney |
| 5,974,235 | A | | 10/1999 | Nunally et al. |
| 6,181,867 | B1 | | 1/2001 | Kenner et al. |
| 6,424,370 | B1 | * | 7/2002 | Courtney ............... 348/143 |
| 6,445,409 | B1 | * | 9/2002 | Ito et al. ................ 348/155 |
| 6,570,608 | B1 | * | 5/2003 | Tserng ................... 348/143 |
| 6,628,835 | B1 | * | 9/2003 | Brill et al. .............. 382/226 |
| 6,643,387 | B1 | * | 11/2003 | Sethuraman et al. ..... 382/107 |
| 6,721,454 | B1 | * | 4/2004 | Qian et al. .............. 382/224 |

(Continued)

OTHER PUBLICATIONS

Medioni et al., "Event Detection and Analysis from Video Streams," IEE Transactions on Pattern Analysis and Machine Intelligence, vol. 23 No. 8, pp. 873-889, Aug. 2001.

*Primary Examiner*—Bhavesh M Mehta
*Assistant Examiner*—Mia M Thomas
(74) *Attorney, Agent, or Firm*—Crompton Seager & Tufte LLC (57) ABSTRACT

Methods and systems for defining, detecting, analyzing, indexing, and retrieving events using video image processing techniques are described herein. An illustrative method of detecting and analyzing events occurring within a region of interest of a video monitoring system may include the steps of extracting information regarding one or more objects located within a region of interest, analyzing the extracted information to detect the occurrence of one or more events within the region of interest, matching at least one of the detected events with a corresponding user-specified event, and performing an action response upon the detection of such an event. In certain embodiments, the detected events may be defined as a set of semantic parameters relating to the object's state and/or physical features, which can be compared against a corresponding set of semantic parameters programmed within a video image-processing appliance manager.

43 Claims, 6 Drawing Sheets

U.S. PATENT DOCUMENTS

| | | | |
|---|---|---|---|
| 6,724,915 B1 | 4/2004 | Toklu et al. | |
| 6,754,389 B1* | 6/2004 | Dimitrova et al. | 382/224 |
| 6,779,027 B1 | 8/2004 | Schunicht et al. | |
| 6,870,945 B2* | 3/2005 | Schoepflin et al. | 382/103 |
| 7,020,336 B2* | 3/2006 | Cohen-Solal et al. | 382/204 |
| 7,068,842 B2* | 6/2006 | Liang et al. | 382/181 |
| 7,200,266 B2* | 4/2007 | Ozer et al. | 382/173 |
| 7,215,322 B2* | 5/2007 | Genc et al. | 345/157 |
| 7,221,775 B2* | 5/2007 | Buehler | 382/100 |
| 7,343,267 B1* | 3/2008 | Casler et al. | 702/189 |
| 7,583,815 B2* | 9/2009 | Zhang et al. | 382/103 |
| 7,653,212 B2* | 1/2010 | Haughawout et al. | 382/100 |
| 7,671,728 B2* | 3/2010 | Buehler | 340/506 |
| 2001/0016007 A1* | 8/2001 | Wu et al. | 375/240.16 |
| 2002/0107949 A1* | 8/2002 | Rawson, III | 709/223 |
| 2003/0044045 A1* | 3/2003 | Schoepflin et al. | 382/103 |
| 2003/0067387 A1* | 4/2003 | Kwon et al. | 340/540 |
| 2003/0126293 A1* | 7/2003 | Bushey | 709/246 |
| 2003/0229549 A1* | 12/2003 | Wolinsky et al. | 705/27 |
| 2004/0081333 A1 | 4/2004 | Grab et al. | |
| 2004/0120548 A1* | 6/2004 | Qian | 382/103 |
| 2004/0130620 A1* | 7/2004 | Buehler et al. | 348/143 |
| 2004/0151342 A1* | 8/2004 | Venetianer et al. | 382/103 |
| 2004/0155960 A1* | 8/2004 | Wren et al. | 348/150 |
| 2005/0057653 A1* | 3/2005 | Maruya | 348/159 |
| 2005/0100192 A1* | 5/2005 | Fujimura et al. | 382/103 |
| 2005/0105769 A1* | 5/2005 | Sloan et al. | 382/103 |
| 2006/0045185 A1* | 3/2006 | Kiryati et al. | 375/240.16 |
| 2006/0062430 A1* | 3/2006 | Vallone et al. | 382/103 |
| 2006/0143493 A1* | 6/2006 | Meis et al. | 714/4 |
| 2006/0215752 A1* | 9/2006 | Lee et al. | 375/240.08 |
| 2006/0215753 A1* | 9/2006 | Lee et al. | 375/240.08 |
| 2006/0238616 A1* | 10/2006 | Curtner et al. | 348/143 |
| 2006/0239645 A1* | 10/2006 | Curtner et al. | 386/95 |
| 2006/0267927 A1* | 11/2006 | Crenshaw et al. | 345/156 |
| 2007/0024706 A1* | 2/2007 | Brannon et al. | 348/142 |
| 2007/0130023 A1* | 6/2007 | Wolinsky et al. | 705/26 |
| 2008/0031491 A1* | 2/2008 | Ma et al. | 382/103 |
| 2008/0087663 A1* | 4/2008 | Mansbery et al. | 219/679 |
| 2008/0247609 A1* | 10/2008 | Feris et al. | 382/118 |
| 2009/0063650 A1* | 3/2009 | Anslow et al. | 709/208 |
| 2009/0064192 A1* | 3/2009 | Betts et al. | 719/318 |
| 2009/0087024 A1* | 4/2009 | Eaton et al. | 382/103 |

* cited by examiner

METHODS FOR DEFINING, DETECTING, ANALYZING, INDEXING AND RETRIEVING EVENTS USING VIDEO IMAGE PROCESSING

FIELD

The present invention relates generally to the field of video image processing. More specifically, the present invention pertains to methods for defining, detecting, analyzing, indexing, and retrieving events using video image processing.

BACKGROUND

Video monitoring systems are used in a variety of applications for monitoring objects within an environment. In security applications, for example, such systems are sometimes employed to track individuals or vehicles entering or leaving a building facility or security gate, or to monitor individuals within a store, office building, hospital, or other such setting where the health and/or safety of the occupants may be of concern. In the aviation industry, for example, such systems have been used to monitor the presence of individuals at key locations within an airport such as at a security gate or parking garage.

In certain applications, the video surveillance system may be tasked to record video image data for later use in determining the occurrence of a particular event. In forensic investigations, for example, it is common to task one or more video cameras within the system to indiscriminately record entire video clips that can later be analyzed to detect the occurrence of an event such as a robbery or theft. Such video images are typically stored as either analog video streams or as digital image data on a hard drive, optical drive, videocassette recorder (VCR), or other suitable storage means.

The process of indiscriminately storing video image data performed by many conventional surveillance systems has several drawbacks. First of all, such systems typically require a massive amount of storage space and processing capability, particularly in those instances where relatively large image sequences (e.g. a 24 hour surveillance tape) are acquired, or where the resolution and/or frame rate of the video cameras is set high. Moreover, the process of manually viewing such video images to detect the occurrence of an event within an image sequence can be time consuming and tedious, in some cases requiring the user to repeatedly scan through the image sequence until the desired event is found. While more modern surveillance systems provide a time and/or date stamp to facilitate recording and searching at specific periods of time, such systems lack the ability to record and index only those events of interest specified by the user.

In some applications, the video surveillance system will be used to assist an operator in performing a particular task. An operator such as a security guard, for example, will typically use such system by monitoring multiple screens of camera inputs while also performing other security-related duties. After some viewing time, user fatigue may limit the ability of the operator to effectively view the monitoring screens. Despite such user fatigue, many analog video surveillance systems do not provide any analysis on the monitor screens. In those video surveillance systems that do provide such analysis, only minimal analysis such as motion detection is typically provided, signaling to the operator that movement of an object within the FOV of a camera has occurred. While such systems are often adapted to present the raw video or motion-cued video to the operator when such motion detection, they do not prompt and/or alert the operator to the occurrence of a user-specified event.

SUMMARY

The present invention pertains to methods for defining, detecting, analyzing, indexing, and retrieving events using video image processing. An illustrative method of detecting and analyzing events occurring within a region of interest of a monitoring system may include the steps of extracting information regarding one or more objects located within a region of interest, analyzing the extracted information to detect the occurrence of one or more events within the region of interest, matching at least one of the detected events with a corresponding user-specified event, and performing an action response upon the detection of an event. The events may be defined as a set of semantic parameters relating to the object's state and/or physical features, which can then compared against a corresponding set of semantic parameters specified by the user.

An appliance manager in communication with a number of appliance modules can be tasked to extract information regarding one or more objects detected within a region of interest. In one illustrative embodiment, for example, the appliance manager can be coupled to a video motion detection module, a video motion tracking module, an object classification module, and an event detection module, which together can be tasked to gather information about an object's motion, trajectory, and/or classification. The appliance manager, appliance module(s), as well as other components of the monitoring system can be controlled via a user interface such as a graphical user interface (GUI). The GUI can be configured to permit the user to select those regions of interest to be analyzed by the monitoring system, those events to be associated with the selected region(s) of interest, as well as various details regarding each configured event. The GUI may also provide a means for the user to set various alarms, to record video clips containing desired events, and/or to send video clips to a terminal station or other location for further analysis. The detected events and associated details can then be used to index the location of the input data. The indexed data at these locations can then be retrieved based on the event conditions and details, if desired.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of algorithms and processes are illustrated for the various elements, those skilled in the art will recognize that many of the examples provided have suitable alternatives that may be utilized.

Figure 1:
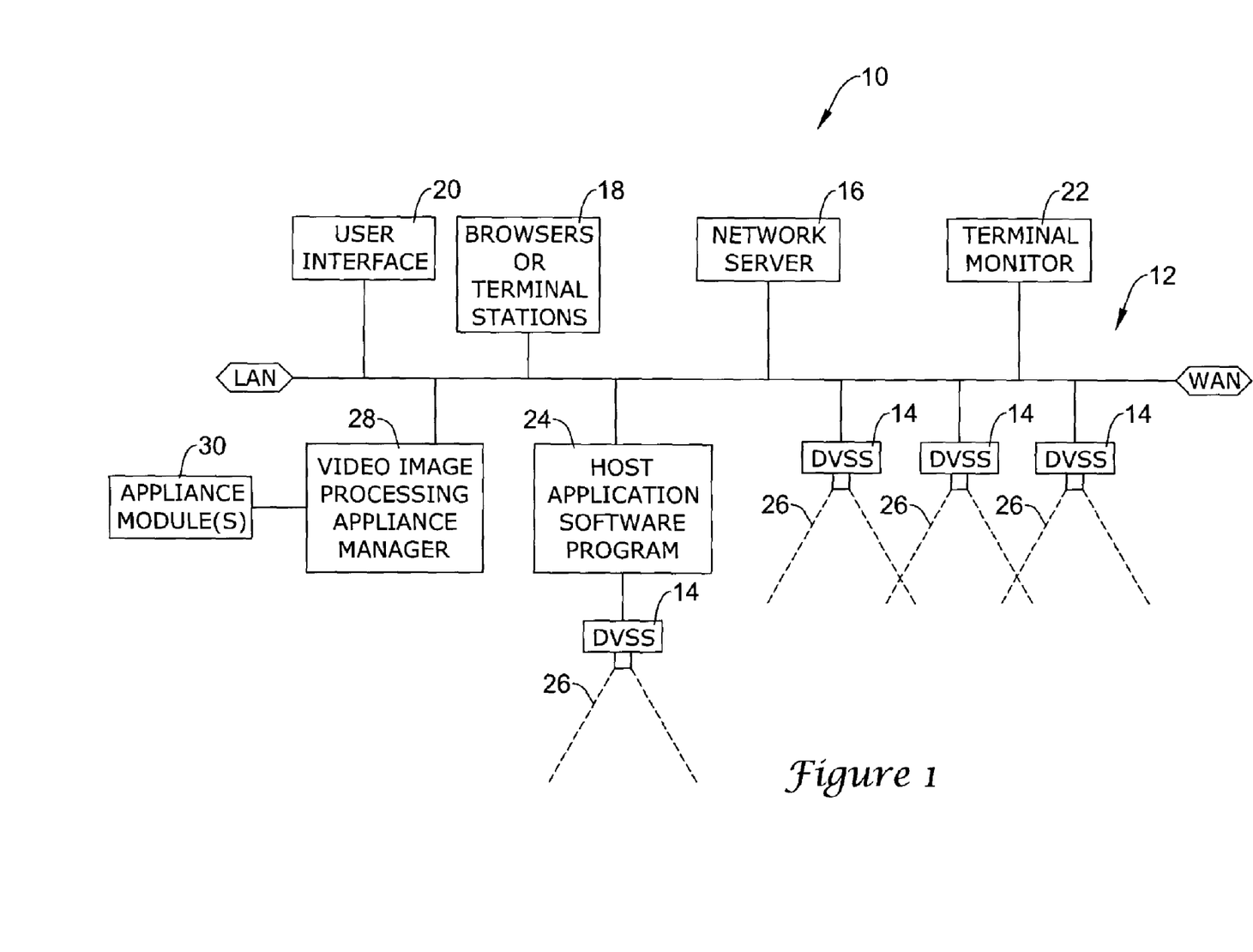
FIG. 1 is a block diagram showing an illustrative network-based video monitoring system for use in monitoring one or more regions of interest within an environment.

FIG. 1 is a block diagram showing an illustrative network-based video monitoring system 10 employing a number of digital video system sensors (DVSS's). System 10, illustratively a video surveillance system for use in detecting and monitoring objects within an environment, may comprise a network 12 such as a wired or wireless local area network (LAN) or wide area network (WAN) that can be used to connect one or more DVSS's 14 to a network server 16 or other such host application. A DVSS can be understood generally as a subsystem that provides sequences of digital video images or other desired data to the monitoring system 10. Examples of DVSS's that can be employed by the system 10 may include, but are not limited to, one or more digital cameras, analog cameras equipped with a digitizer, frame grabbers, digital video recorders, files of stored video data in a database, microphones for audio signal capture, accelerometers for seismic data capture, pressure sensors, temperature sensors, level and/or flow sensors, proximity sensors, contact sensors (e.g. window or door switches), and/or multi-spectral sensors.

A number of browsers or terminal stations 18 equipped with a user interface 20 (e.g. a graphical user interface) can be connected to the network 12 and tasked to control the operation of the DVSS's 14 in a particular manner. In some embodiments, a terminal monitor 22 (e.g. a closed-circuit television monitor) can also be provided in addition to, or in lieu of, the browsers or terminal stations 18 to view images acquired from one or more of the DVSS's 14. The browsers or terminal stations 18 can be configured to interact with a host application software program 24 that can be used to task the DVSS's 14 in a particular manner. Based on user input via the user interface 20, for example, the host application software program 24 can be used to change operational parameters of the DVSS's 14 (e.g. PTZ settings, ROI settings, resolution, frame rate, etc.), and/or to task a video image processing appliance manager 28 to perform certain user-defined tasks such as motion detection, motion tracking, etc. If, for example, the user desires to increase the resolution of images received by one or more of the DVSS's 14 in order to perform facial recognition of an individual within a region of interest, the host application software program 24 can be configured to accept a command causing one of the DVSS's 14 to zoom-in on the subject's face and increase the image capture rate. In the illustrative embodiment of FIG. 1, three DVSS's 14 are shown connected to the network 12, each of which can be tasked to acquire video and/or still images within a respective field of view (FOV) represented generally by dashed lines 26. It should be understood, however, that a greater or lesser number of DVSS's 14 may be employed, if desired. As shown in FIG. 1, the DVSS's 14 can be connected to the network 12 directly, through the host application software program 24, or both, as desired.

As can be further seen in FIG. 1, the host application software program 24 can be configured to call a video image-processing appliance manager 28 that can be used to facilitate processing of video images received from the DVSS's 14 using a number of plug-in appliance modules 30. The appliance manager 28 can be adapted to interface with the host application software program 24 as well as other components within the system 10. The video images and/or other information acquired by the DVSS's 14 can be fed through the appliance manager 28, which tasks the appropriate appliance modules 30 to determine the occurrence of any events configured within the system 10. If an event is triggered, the appliance manager 28 can be configured to output a response (e.g. via the user interface 20) indicating that an event has occurred within a region of interest. If desired, the video images triggering the event can be stored on a hard-drive, magnetic tape, or other storage medium, allowing the video images to be replayed and/or subsequently processed. In some embodiments, the video images acquired from the DVSS 14 can also be displayed in real-time on the terminal monitor 22.

Figure 2:
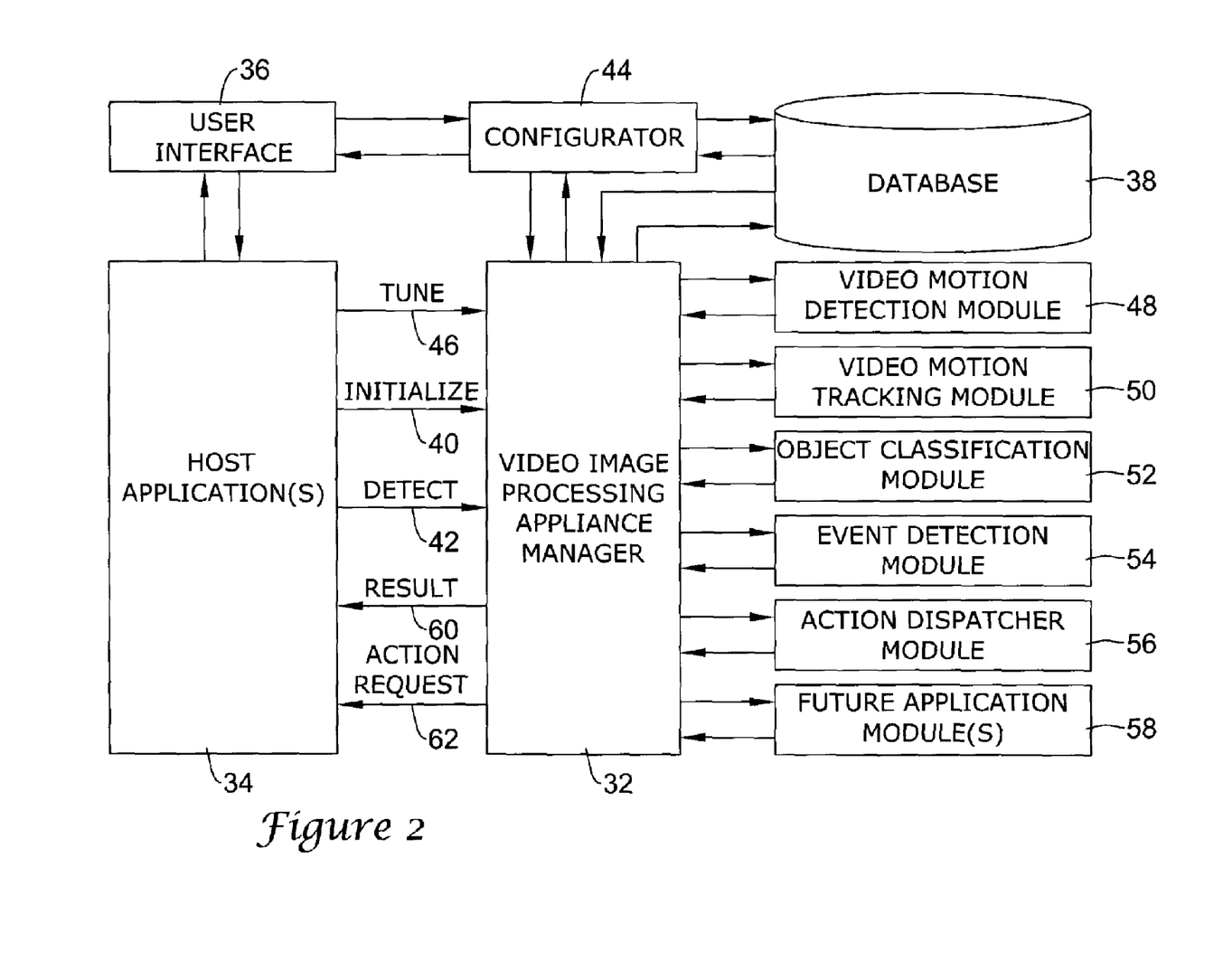
FIG. 2 is a block diagram showing the architecture of a video image-processing appliance manager in accordance with an exemplary embodiment of the present invention.

FIG. 2 is a block diagram showing the architecture of a video image-processing appliance manager 32 in accordance with an exemplary embodiment of the present invention. As shown in FIG. 2, the appliance manager 32 may provide an interface to a number of host applications 34, which as is described above with respect to FIG. 1, can include various software algorithms and/or functionality for operating a number of DVSS components. The host applications 34 may include, for example, an existing host application software program configured to interact with one or more video cameras (e.g. DVSS's) each adapted to acquire video images within a field of view (FOV). The appliance manager 32 can also be interfaced with other types of DVSS's including, but not limited to, frame grabbers, digital video recorders, files of stored video data in a database, microphones for audio signal capture, accelerometers for seismic data capture, pressure sensors, temperature sensors, level and/or flow sensors, proximity sensors, contact sensors (e.g. window or door switches), and/or multi-spectral sensors, as desired.

The host applications 34 can comprise separate components from the DVSS's (e.g. a stand-alone software package), or can be formed integral with one or more of the DVSS's and provided as a single component, if desired. In certain embodiments, for example, one or more of the DVSS's may comprise a physically separate video camera that is connected to an existing software-based host application adapted to run on the Internet, an intranet connection, and/or on an individual workstation equipped with a user interface 36. In such applications, each of the associated DVSS's can be connected to their associated host application 34 using an application program interface (API) or other suitable interface.

The host applications 34 may comprise one or more existing host application software programs contained on a network server, browser, terminal station, or other platform. The functionality provided by the existing host applications 34 will typically vary depending on their intended use. If, for example, the host applications 34 are adapted to interface with network-based control, access, and security systems/products, the host applications 34 may include an existing security software program that can be used to task a number of DVSS's to pan, tilt, and zoom to a tracked motion within a region of interest. Examples of other types of host applications 34 may include, but are not limited to, building management applications (e.g. HVAC control), life safety applications (e.g. fire protection, medical care, etc.), asset location applications, and energy management applications.

The appliance manager 32 will typically comprise a separate module from the host applications 34, allowing the appliance manager 32 to be linked with the user's existing system without having to significantly modify or reprogram the existing software to accommodate new DVSS clients as they are added to the system. It should be understood, however, that the appliance manager 32 and host applications 34 could be incorporated together as a single, stand-alone module, if desired.

The appliance manager 32 can be configured to maintain one or more business objects, which can include various information about the region or regions of interest to be monitored, any events configured by a configurator 44, as well as various configuration information about the host applications 34 connected to the system. In certain embodiments, for example, the appliance manager 32 can be configured to maintain a camera structure list and an event structure list containing information about the type of DVSS's employed and the type of events configured within the system. Such lists can be stored within a memory unit or database (e.g. database 38) and recalled each time the appliance manager 32 receives an initialization call 40 or detection call 42 from one or more of the host applications 34.

The video monitoring system may include a configurator 44 that can be used in the direct manipulation and configuration of images or other data received by the host applications 34. A tuning request/call 46 received from one or more of the host applications 34 can be used by the configurator 44 to tune the appliance manager 32 and/or other desired system components to function in a particular manner. If, for example, a user desires to increase the frame capture rate of one of the DVSS's 14 (e.g. a video camera) field of view, the host application 34 can be configured to send a tuning request or call 46 to the appliance manager 32 that can be used by the configurator 44 to coordinate such a change. Once the change has been made, the appliance manager 32 can then be configured to pass the newly configured video stream through. In some embodiments, the configurator 44 can also be configured to send a response to the host application 34 and/or to the user indicating whether the tuning invocation succeeded or failed.

The appliance manager 32 can be connected to a database 38 that can be configured to store information received from the DVSS's as well as parameters received by the configurator 44, as directed by the appliance manager 32 and/or user via the user interface 36. In certain embodiments, the database 38 can be two separate databases residing at different servers, wherein one database can be linked to the host application 34 and the other database can be linked to the appliance manager 32. In other embodiments, the database 38 may comprise a single database, or multiple databases existing on a single server.

The appliance manager 32 can be configured to interact with a number of plug-in appliance modules each adapted to run various video image-processing algorithms or routines that can be used to perform certain user-defined image processing functions. In the illustrative embodiment of FIG. 2, for example, the appliance manager 32 is shown operatively connected to a video motion detection (VMD) module 48, a video motion tracking (VMT) module 50, an object classification (OC) module 52, an event detection module 54, and an action dispatcher module 56. The various appliance modules 48,50,52,54,56 can be provided as either software appliances adapted to be run on a network or terminal server, or as separate hardware units that can be plugged into the appliance manager vis-à-vis a network bridge or other suitable connection. These modules 48,50,52,54,56 can be upgraded, when needed, to enhance performance and/or meet specific host application requirements.

The appliance manager 32 can be configured to permit the modular incorporation of future appliance modules 58, as desired. If, for example, the user desires to add a facial detection module or rapid eye detection module to the video monitoring system, the appliance manager 32 can be configured to accept a software call, network socket, physical port (e.g. a USB port, Firewire/IEEE 1394 port, parallel/serial port, etc.), and/or wireless port that can be used to add the additional modules. Since an appliance manager 32 is provided to interface with the host applications 34, the addition of future plug-in modules does not require the user to re-code or re-formulate the existing host applications 34. In addition, the appliance manager 32 may provide the user with the ability to change the implementation and/or features of existing functionality without significantly affecting the operation of the DVSS's.

The appliance manager 32 can be configured to run a video image-processing algorithm or routine that continuously monitors the camera structure list and configured events list to determine whether an event has been detected by one or more of the DVSS's. When an event contained within the event list is detected, the appliance manager 32 can be configured to transmit a result 60 back to the host application 34 along with an action request 62 tasking one or more of the DVSS's to operate in a particular manner. If, for example, the video motion tracking module 50 detects that an object is moving in a particular direction within a region of interest, the appliance manager 32 can be configured to provide a result 60 to the appropriate host application 34 informing it that the object is being tracked along with an action request 62 tasking one or more associated DVSS's to track the object.

Figure 3:
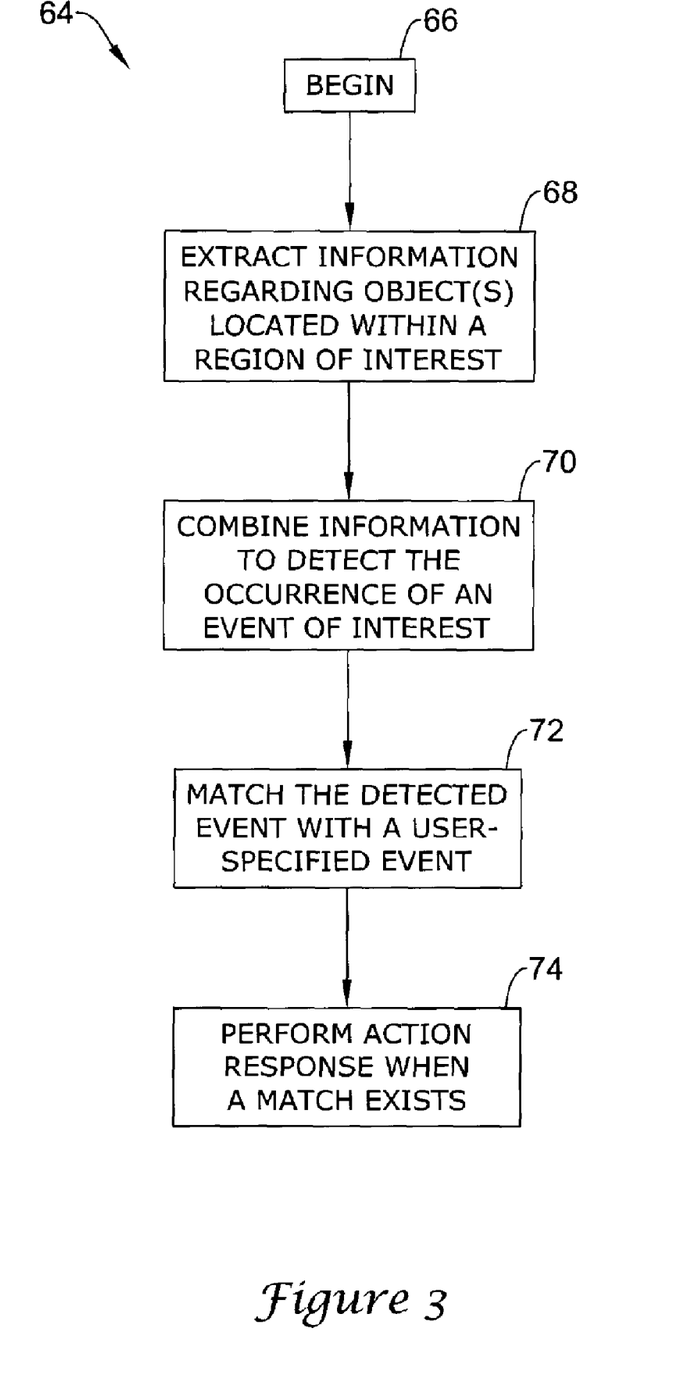
FIG. 3 is a flow chart showing an illustrative method of defining and analyzing events occurring within a region of interest of a video monitoring system in accordance with an exemplary embodiment of the present invention.

Turning now to FIG. 3, an illustrative method 64 of defining and analyzing events occurring within a video monitoring system will now be described in the context of the illustrative appliance manager 32 of FIG. 2. As shown in FIG. 3, method 64 may begin at block 66, wherein a call is received by the appliance manager 32, causing the appliance manager 32 to initialize an algorithm or routine therein that can be used in defining, detecting, analyzing, indexing, and/or retrieving one or more events of interest. In the context of the illustrative video monitoring system 10 described above with respect to FIG. 1, for example, such appliance manager 32 may be called when a user and/or host application desires to task one or more DVSS's 14 to detect the occurrence of an event within a field of view.

Once invoked, the appliance manager 32 can be configured to task one or more of the appliance modules to extract information regarding one or more objects located within a region of interest, as indicated generally by reference to block 68. Information that can be extracted at this step may include, for example, information about an object's motion, trajectory, orientation, size, aspect ratio, color, lighting, temperature, and/or information about an object's type or classification (e.g. "human", "animal", "vehicle", "animate", "inanimate", etc.). Such extracted information can be obtained using one or more of the appliance modules 48,50,52,54 described above with respect to FIG. 2. If, for example, the user wishes to define an event that detects and tracks vehicle motion within a parking garage, the appliance manager 32 tasks the video motion detection module 48 and video motion tracking module 50 to run separate algorithms or routines that can be used to perform such tasks. Information regarding the classification of the object, in turn, can be determined by invoking the object classification module 52 and running an algorithm or routine therein that determines whether an object is a vehicle. In some embodiments, the appliance manager 32 can be configured to task a video face detection module and/or video face tracking module to run separate algorithms or routines that can be used to gather information to perform facial recognition on individuals. The types of information extracted by the monitoring system will typically vary depending on the types of video cameras employed, the location of the video cameras, the particular appliance module(s) available to the system, as well as other factors.

Once the information is extracted within a region of interest, the appliance manager 32 tasks the event detection module 54 to combine this information in a meaningful manner to detect the occurrence of an event of interest, as indicated generally by reference to block 70. Each event of interest can be specified by a set of conditions and/or sub-conditions that identify the object and semantically describe its state and/or physical features relative to a particular region of interest. In certain embodiments, for example, each condition and/or sub-condition can be quantified by a set of semantic parameters that can be compared against a corresponding set of semantic parameters programmed within the event detection module 54. Examples of such semantic parameters may include, but are not limited to, information regarding the region of interest (e.g. "entranceway", "parking garage", "security zone", "conveyor belt", etc.), actions relating to the object (e.g. "start", "stop", "enter", "exit", etc.), and information regarding the direction of the object (e.g. "left", "right", "top" bottom", etc.). In some embodiments, semantic parameters relating to the type or classification of object detected (e.g. "human", "animal", "vehicle", "animate", "inanimate", "other", "any", etc.) may also be provided. In other embodiments, semantic parameters relating to the type of motion (e.g. walk, run, high speed, low speed, etc.) may also be provided. Semantic parameters relating to the physical appearance (e.g. color and size of object, single or group of people) or for a particular detected face (e.g. "happy, "neutral", "sad", etc.) may also be provided, if desired.

Once the semantic parameters are combined and analyzed to detect the occurrence of an event, such information can be compared against a set of user-specified events, as indicated generally by reference to block 72. Matching of the detected event with a corresponding user-specified event can be accomplished automatically by comparing the semantic parameters determined by the appliance modules with a set of semantic parameters specified by the user. If, for example, an event occurring within a region of interest is defined using a set of semantic parameters including the text "vehicle", "enters from right", and "within ROI 1", such event can be compared against a set of user-specified semantic parameters containing the text "vehicle enters from right in ROI 1" to find a match. In certain embodiments, such user-specified semantic parameters can be stored as event parameters within an image database (e.g. database 38), and can be provided to the event detection module 54 through the appliance manager 32 via a graphical user interface or other suitable interface. Indexing and/or subsequent retrieval of such events can also be accomplished in a similar manner using such semantic parameters, if desired.

When a match exists, the appliance manager 32 invokes the action dispatcher module 56 to set up the appropriate action request or requests and perform an action response, as indicated generally by reference to block 74. In certain embodiments, for example, the action dispatcher module 48 can be configured to trigger an alarm or other such response to notify a user when a configured event has been detected. The appliance manager 32 can also be configured to record a video clip containing the detected event and/or send a video feed to a terminal station, browser, network server, or other such location for further analysis by a user and/or host application. In some embodiments, the video feed may contain one or more supporting event parameters. Other action responses such as that described below with respect to the illustrative graphical user interface 122 of FIG. 6 can also be performed, if desired.

Figure 4:
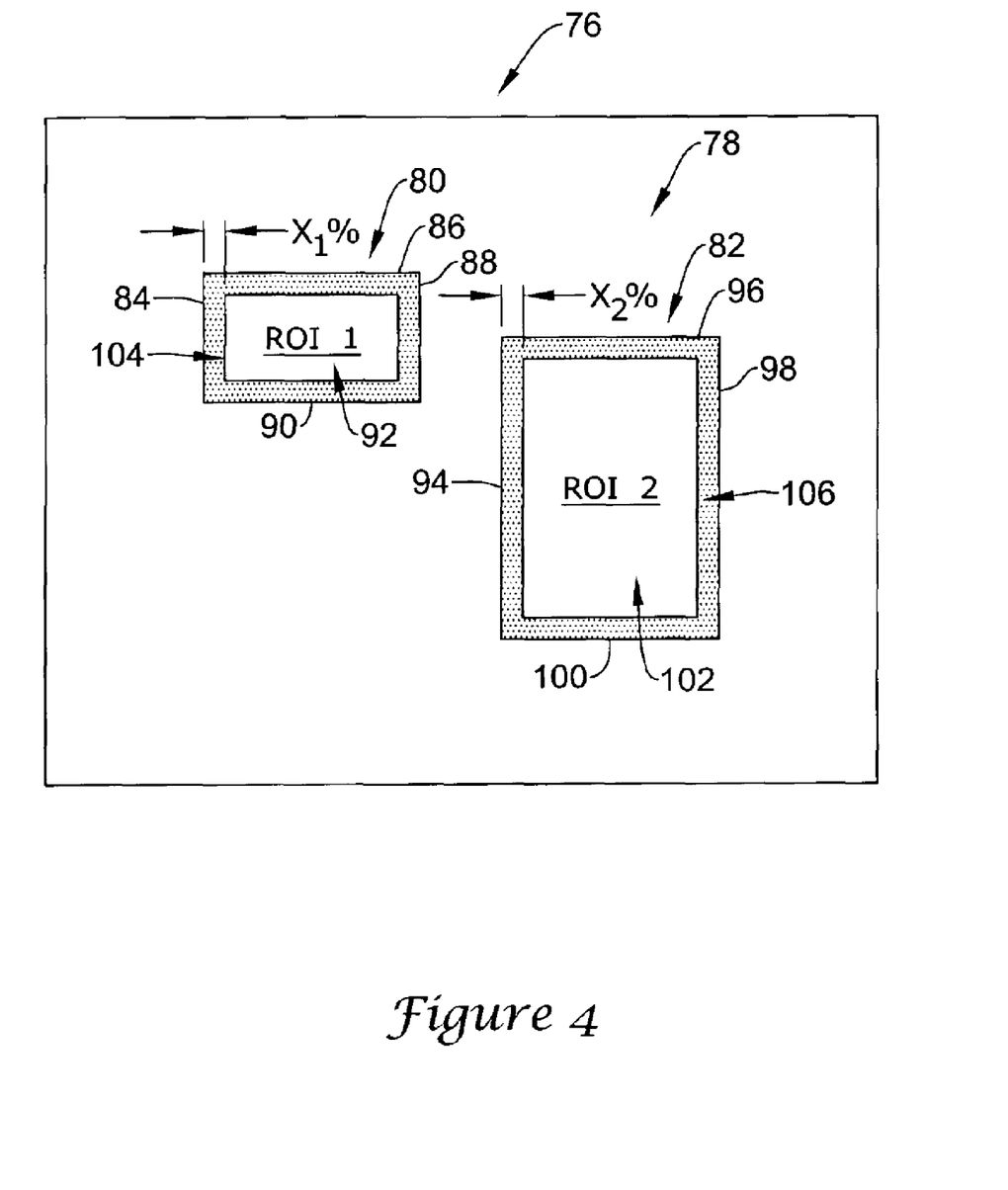
FIG. 4 is a pictorial view showing an illustrative video frame including multiple regions of interest.

FIG. 4 is a pictorial view showing an illustrative video frame 76 including multiple regions of interest. As can be seen in FIG. 4, video frame 76 may define a pixel area 78 having a first region of interest 80 and a second region of interest 82. The first and second regions of interest 80,82 may represent, for example, regions of interest within a security zone or other such area in which the monitoring of individuals, vehicles, or other objects of interest is desired. In certain embodiments, for example, the first region of interest 80 may represent an entranceway of a building or structure whereas the second region of interest 82 may represent a parking garage or carport. While two regions of interest 80,82 are specifically depicted in the illustrative view of FIG. 4, it should be understood that a greater or lesser number of regions of interest could be defined. Moreover, while the two regions of interest 80,82 are shown having a substantially rectangular shape in FIG. 4, it should be understood that the regions of interest 80,82 may assume other polygonal shapes within the video frame 76. If, for example, a particular region of interest to be monitored comprises a parking lot, then a more complex polygonal shape approximating the boundaries of that region may be utilized.

The first and second regions of interest 80,82 may be shaped as any closed polygon in the image defined by the vertices of the polygon. In the illustrative view of FIG. 4, for example, the first region of interest 80 is shown as a polygon (e.g. a rectangle) having a left side boundary 84, a top side boundary 86, a right side boundary 88, and a lower side boundary 90, which define a first pixel area 92 within the video frame 76. In similar fashion, the second region of interest 82 is shown as a polygon having a left side boundary 94, a top side boundary 96, a right side boundary 98, and a lower side boundary 100, which define a second pixel area 102 within the video frame 76. In the illustrative video frame 76 depicted in FIG. 4, the pixel areas 92,102 defined by each respective region of interest 80,82 are non-overlapping such that none of the image pixels contained in the first pixel area 92 overlap with any of the image pixels contained in the second pixel area 102. It should be understood, however, that other embodiments are envisioned wherein portions of the regions of interest 80,82 overlap one another. In some embodiments, other polygons having a non-rectangular shape may be defined as the ROI. In such case, the major and minor axes of the ROI are determined and a rectangular region defined by the major and minor axes can be used for evaluating the event conditions, as described below.

As can be further seen in FIG. 4, the first and second regions of interest 80,82 may each define an ROI boundary area 104,106, which as indicated by shading, can be located about the outer periphery of each respective pixel area 92,102. Each ROI boundary area 104,106 can be defined as a percentage or fraction of the total number of pixels contained within the pixel area 92,102. In the illustrative video frame 76 of FIG. 4, for example, the first and second regions of interest 80,82 may have respective ROI boundary areas 104,106 defined as percentage values $x_1\%$ and $x_2\%$, respectively, wherein each percentage value $x_1\%$, $x_2\%$ is expressed as a percentage of the pixel area of the ROI boundary area 104,106 relative to their corresponding pixel area 92,102. The size, shape and locations of the ROI boundary areas 104,106 may vary depending on the type of region selected by the user, the characteristics of the objects located within that scene, as well as other factors. Thus, while rectangular-shaped ROI boundary areas 104,106 are specifically depicted in the illustrative embodiment FIG. 5, it should be understood that other types of ROI boundary areas 104,106 can be utilized. If, for example, the ROI to be monitored is a building or structure having an irregular shape, then the ROI boundary area 104, 106 used to define that ROI may have also have an irregular shape to better approximate the ROI. Such irregular shape may be defined, for example, by selecting a greater number of reference points on the video frame 76, using curved lines to define the boundary area, and/or by some other suitable technique. The number of ROI's located within the video frame 76 may vary depending on the number of ROI's to be monitored.

Figure 5:
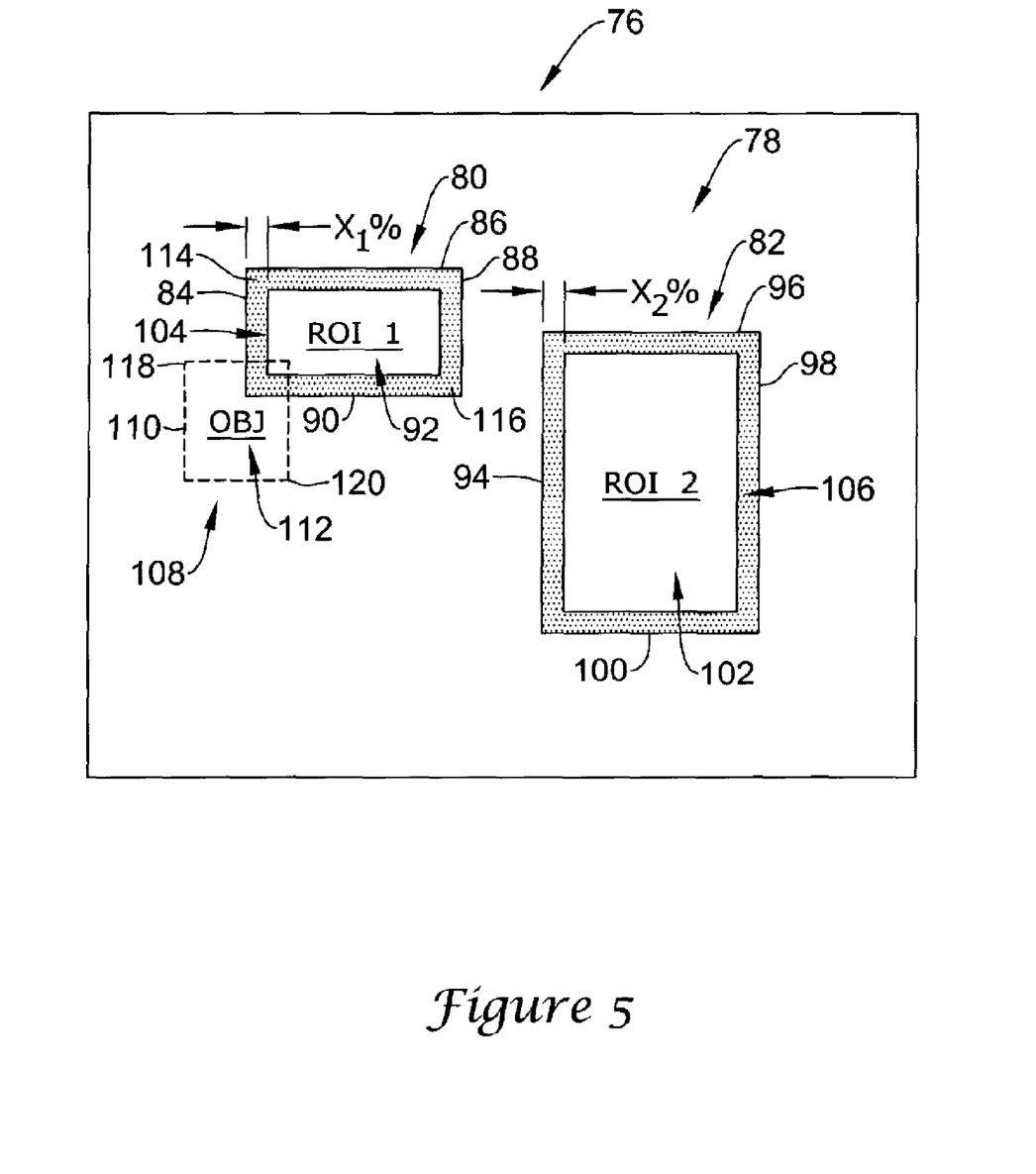
FIG. 5 is another pictorial view of the illustrative video frame of FIG. 4 showing the juxtaposition of a minimum boundary rectangle of an object within a region of interest.

FIG. 5 is another pictorial view of the illustrative video frame 76 of FIG. 4 showing the juxtaposition of a minimum boundary rectangle 108 of an object within the first region of interest 80. As shown in FIG. 5, the minimum boundary rectangle 108 may include an outer boundary 110 defining an area 112 containing an object OBJ such as an individual or vehicle. In the illustrative view depicted in FIG. 5, the minimum boundary rectangle 108 is shown covering a lower-left portion of the ROI boundary area 104, intersecting the left side boundary 84 and bottom side boundary 90 of the first region of interest 80.

Using the minimum boundary rectangle 108 to represent the general shape of the object OBJ, a number of events relating to the object's motion relative to the first region of interest 80 can be determined by comparing the coordinates of the ROI boundary area 104 with a corresponding set of coordinates of the minimum boundary rectangle 108. In the illustrative embodiment of FIG. 5, for example, an upper-left location 114 and lower-right location 116 of the ROI boundary area 104 can be assigned a set of coordinates of $(R_{X1}, R_{Y1})$ and $(R_{X2}, R_{Y2})$, respectively. In similar fashion, an upper-left location 118 and lower-right location 120 of the minimum boundary rectangle 108 can be assigned a corresponding set of coordinates $(O_{X1}, O_{Y1})$ and $(O_{X2}, O_{Y2})$, respectively. A similar coordinate scheme can be utilized for other objects and regions of interest situated within the video frame 76, as desired.

While the upper-left and lower-right locations 114,116, 118,120 are selected in FIG. 5 as reference points to determine the position of the minimum boundary rectangle 108 relative to the first region of interest 80, it should be understood that other reference locations could also be utilized, if desired. In one alternative embodiment, for example, the lower-left and upper-right locations of the first ROI boundary area 104 and minimum boundary rectangle 108 could be used as reference points. Moreover, while the use of a minimum boundary rectangle 108 is specifically shown in the illustrative view of FIG. 5, those of skill will recognize that other boundary shapes could be used to approximate the size and/or contour of the object. Moreover, annotation information such as object labels, motion trails, motion direction arrows, highlighting of detected objects, etc. can be further provided to aid the user in identifying and tracking objects within the video frame 76, if desired.

In certain embodiments, and as further shown in Table 1 reproduced below, the sets of upper-left and lower-right coordinates $(R_{X1}, R_{Y1}), (R_{X2}, R_{Y2})$ and $(O_{X1}, O_{Y1}), (O_{X2}, O_{Y2})$ can be used to define various event conditions (i.e. semantic parameters) relating to the object's location and direction relative to the ROI boundary area 104 by comparing the corresponding coordinate values. If, for example, the left side of the minimum boundary rectangle 108 is located within the left side boundary 84 of the ROI boundary area 104, then the equation $0 < O_{X2} - R_{X1} < x_1 \% (R_{X2} - R_{X1})$ will be satisfied, thus indicating that a "Left" event has occurred. Conversely, if the right side of the minimum boundary rectangle 108 is located within the right side boundary 88 of the ROI boundary area 104, then the equation $0 < R_{X2} - O_{X1} < x_1 \% (R_{X2} - R_{X1})$ will be satisfied, indi-cating that a "Right" event condition has occurred. In similar fashion, if the bottom side of the minimum boundary rectangle 108 is located within the top side boundary 86 of the ROI boundary area 104, then the equation $0 < O_{Y2} - R_{Y1} < x_1 \% (R_{Y2} - R_{Y1})$ will be satisfied, indicating that a "Top" event condition has occurred. Likewise, if the top side of the minimum boundary rectangle 108 is located within the bottom side boundary 90 of the ROI boundary area 104, then the equation $0 < R_{Y2} - O_{Y1} < x_1 \% (R_{Y2} - R_{Y1})$ will be satisfied, indicating that a "Bottom" event condition has occurred. If desired, motion in directions other than "left", "right", "top", and "bottom" may also be determined. In addition, other event conditions (e.g. "Start Track", "Enters Region", "Stop Track", "Exits Region", etc.) may also be defined by determining the state of the object track and comparing the coordinate values of the minimum boundary rectangle 108 relative to the ROI boundary area 104, and/or by comparing the location of the minimum boundary rectangle 108 relative to other locations within the video frame 76.

TABLE 1

| Event Name | Definition of Event |
|---|---|
| "Start Track" | Object establishes a new track within the video image and the sides of the object's MBR are not within the ROI boundary area |
| "Enters Region" | Object establishes a new track and any one side of the object's MBR is located within the ROI boundary area |
| "Stop Track" | Track of object ends within the video image and the sides of the object's MBR are not within the ROI boundary area |
| "Exits Region" | Track of object ends within the video image and any one side of the object's MBR is located within the ROI boundary area |
| "Left" | The left side of the MBR of the object is located within the left ROI boundary area |
| "Right" | The right side of the MBR of the object is located within the right ROI boundary area |
| "Top" | The top side of the MBR of the object is located within the top ROI boundary area |
| "Bottom" | The bottom side of the MBR of the object is located within the bottom ROI boundary area |

In certain cases, multiple event conditions may be satisfied for the same object. If, as shown for example in FIG. 5, the minimum boundary rectangle 108 of the object OBJ enters the ROI boundary area 104 simultaneously from both the left and bottom side boundaries 84,90, a "Left" and "Bottom" event condition will be detected. In such case, the monitoring system can be configured to combine the two semantic parameters into a string of semantic parameters using a suitable Boolean operand such as "and" or "+". Once the event conditions (i.e. semantic parameters) are combined, the monitoring system can then be configured to match these event conditions with a corresponding set of event conditions specified by the user.

Figure 6:
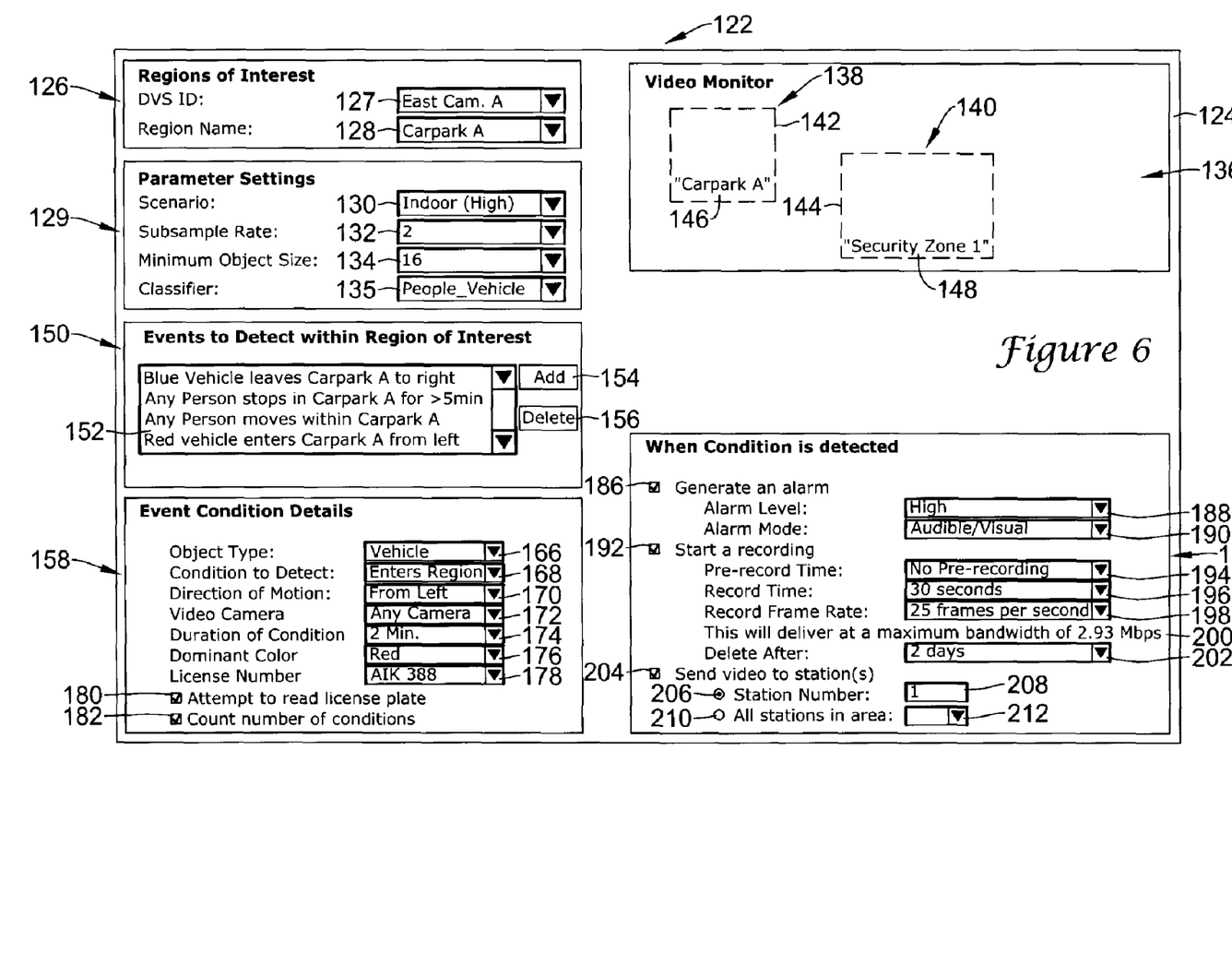
FIG. 6 is a pictorial view showing an illustrative graphical user interface in accordance with an exemplary embodiment of the present invention.

Referring now to FIG. 6, an illustrative graphical user interface 122 in accordance with an exemplary embodiment of the present invention will now be described in conjunction with the illustrative appliance manager 32 of FIG. 2. Graphical user interface 122 may include a display screen 124 configured to display various information related to events configured within the appliance manager 32 as well as the various appliance modules (e.g. the event detection module 54). In the illustrative embodiment of FIG. 6, for example, the graphical user interface 122 may include a REGIONS OF INTEREST section 126 that permits the user to identify various regions of interest within the field of view (FOV) of a DVSS in the monitoring system. The REGION OF INTEREST section 126 may include a DVS ID menu button 127 that can be used to specify where the region of interest is location, and a REGION NAME menu button 128 that can be used to name a particular region of interest (e.g. "Carpark A") in which to detect events. The region name uniquely associates with an area in the FOV of the DVSS whose identity is specified by the DVS ID menu button 127. This area can be displayed and annotated in the display screen 124 of the graphical user interface 122. When selected via a mouse, keyboard, keypad, touch screen, or other suitable selection means, the graphical user interface 122 can be configured to display a list of those regions of interest available for detection within the FOV of the DVS ID 127 by the monitoring system.

Other information (e.g. the coordinates of the corners of the region of interest) can also be displayed and/or be configured via the graphical user interface 122, if desired. In the illustrative embodiment of FIG. 6, for example, the graphical user interface 122 may include a PARAMETER SETTING section 129 that permits the user to specify the parameter values of the various appliance modules. A SCENARIO menu button 130 within the PARAMETER SETTING section 129 can be provided to permit the user to adjust the sensitivity at which events are detected. If, for example, the selected region of interest is located indoors where lighting conditions are typically bright, the user may select "Indoors (High)" or other appropriate text using the SCENARIO menu button 130. Other suitable selections such as "Outdoors (Low)" or "Mixed Conditions (Intermediate)" may also be implemented using the SCENARIO menu button 130, if desired. In some embodiments, a SUB-SAMPLING menu button 132 and MINIMUM OBJECT SIZE text box 134 may also be provided to permit the user to adjust the sub-sampling rate of images captured and/or to set the minimum size of objects to be detected. In some embodiments, a CLASSIFIER menu button 135 may be provided to permit the user to specify which classifier and its associated parametric values to be used in classifying the object. Other parameters in addition to those specifically depicted in FIG. 6 may also be provided to facilitate operation and/or configuration of the monitoring system, if desired.

A VIDEO MONITOR section 136 of the graphical user interface 122 can be configured to display video images and/or still images acquired by one or more of the DVSS's within the monitoring system. In some embodiments, the DVS ID, which captures the video image, may also be superimposed on the VIDEO MONITOR section 136. In the illustrative view depicted in FIG. 6, for example, the graphical user interface 122 is shown displaying a first region of interest 138 in an upper-left portion of the VIDEO MONITOR section 136, and a second region of interest 140 in a lower-right portion of the VIDEO MONITOR section 136. Each region of interest 136,138 can be demarcated on the display screen 124 using a dashed boundary box 142,144 or other suitable visual indicator. In some embodiments, the corresponding region name (e.g. "Carpark A", "Security Zone 1", etc.) 146,148 may also be superimposed on each region of interest 138,140 displayed on the display screen 124, if desired.

An EVENTS TO DETECT WITHIN REGION OF INTEREST section 150 of the graphical user interface 122 can be provided to permit the user to select those event conditions to be detected within the particular region of interest selected via the REGION NAME menu button 128. A list of event conditions currently programmed within the monitoring system can be displayed within a text box 152 located within section 150. An ADD icon button 154 located to the right of the text box 152 can be provided to permit the user to add additional event conditions to be detected by the monitoring system. A DELETE icon button 156 also located to the right of the text box 152, in turn, can be provided to permit the user to delete one or more event conditions currently programmed within the monitoring system. If desired, the current event condition selected within the text box 152 (i.e. "Red Vehicle Enter Carpark A From Left") can be highlighted by blinking text, italics, inverted text, or other suitable visual means. When the ADD icon button 154 is selected, the user can be prompted to enter the desired event conditions.

An EVENT CONDITION DETAILS section 158 of the graphical user interface 122 can be configured to permit user entry as well as display those details associated with each event condition configured within the monitoring system. In the illustrative embodiment of FIG. 6, for example, an OBJECT TYPE menu button 166 and a CONDITION TO DETECT menu button 168 can be provided to permit the user to select the type of object and event condition(s) to be detected. If, for example, the user desires to monitor vehicles entering a carpark, the user may select "vehicle" using the OBJECT TYPE menu button 166 and "enters region" using the CONDITION TO DETECT menu button 168. Examples of other object types or classifications that can be selected using the OBJECT TYPE menu button 166 may include "individual", "animal", "animate object", "inanimate object", "any object", "unknown object", etc. Examples of other types of event conditions that can be selected using the CONDITION TO DETECT menu button 168 may include "start track", "stop track", "exits region", "movement detected", etc.

A DIRECTION OF MOTION menu button 170 can be provided to permit the user to select the direction or directions in which an object triggers an event. If, for example, the user desires to detect only those events in which an object travels through a region of interest from the left, the user may select "From Left" using the DIRECTION OF MOTION menu button 170, causing the monitoring system to perform an action response only when the object is traveling from this direction. Alternatively, if the user desires to detect only those events in which an object is traveling from the right, from above, or from below, the user may select "From Right", "From Above", and/or "From Below" or other appropriate text using the DIRECTION OF MOTION menu button 170, causing the monitoring system to perform an action response only when the object is traveling from these directions. If desired, the graphical user interface 122 may permit the user to select multiple directions (e.g. "From Left" and "From Below)" in which to detect and/or track object motion.

In certain embodiments, the graphical user interface 122 can be configured to permit the user to specify more complex motion to be detected and tracked. If, for example, the user desires to detect when an object traverses a serpentine-like path within a particular region of interest, the user may select "Serpentine Path" or other appropriate text using the DIRECTION OF MOTION menu button 170, causing the monitoring system to perform an action response when the object travels in such pattern. Other user-specified directions and/or paths can be further implemented in similar fashion via the DIRECTION OF MOTION menu button 170, if desired.

A VIDEO CAMERA menu button 172 can be provided to permit the user to select those video cameras to be tasked in detecting events. If, for example, the user desires to separately task one or more video cameras (e.g. "Camera 1", "Camera 2", "Cameras 1 & 2", etc.) to detect object motion within a particular region of interest, the user may select the appropriate camera name using the VIDEO CAMERA menu button 172. Alternatively, and as shown in FIG. 6, if the user desires to task all of the video cameras to detect a particular event, the user may select "Any Camera" or other appropriate text using the VIDEO CAMERA menu button 172. In certain embodiments, other components (e.g. motion sensors, temperature sensors, etc.) used by the video monitoring system to detect events may be tasked in similar fashion using the VIDEO CAMERA menu button 172, if desired.

A DURATION OF CONDITION menu button 174 can be provided on the graphical user interface 122 to permit the user to select the period of time necessary to trigger an event. If, for example, the user desires to trigger only those events lasting for a duration of two minutes or more, the user may select "2 Min" or other appropriate text using the DURATION OF CONDITION menu button 174. Other durations (e.g. "1 Min", "30 Min", "1 Hr.", "4 Hrs.", "1 Day", etc.) may also be provided via the DURATION OF CONDITION menu button 174 to permit the user to select other time periods, as desired. In some embodiments, the graphical user interface 122 can be configured to accept a user-specified duration if the user desires to set a time period different than that contained in memory.

In certain embodiments, a DOMINANT COLOR menu button 176 and LICENSE NUMBER menu button 178 can be provided to permit the user to select the color and/or license number of any vehicles to be detected by the monitoring system. If, for example, the user desires to detect only those vehicles that are of a particular color (e.g. "red", "green", "blue", "white", "light", "dark", etc.) or of a particular license plate number or type (e.g. "AlK388", <Minnesota>, <Blacklisted>, etc.), the user may enter such information into the graphical user interface 122 via the DOMINANT COLOR and LICENSE NUMBER menu buttons 176,178. A set of selection boxes 180,182 can be selected on the display screen 124 to task the monitoring system to attempt to read license plate numbers and/or to count the number of event conditions satisfied. In certain embodiments, for example, box 182 can be selected if the user desires to count the number of vehicles, individuals, and/or other objects passing in and out of a region of interest such as a security checkpoint.

A WHEN CONDITION IS DETECTED section 184 of the graphical user interface 122 can be provided to permit the user to select those actions to be associated with a particular event. An ALARM selection box 186 can be selected to generate an alarm when an event is detected by the monitoring system, or when an error or other user-specified condition has occurred. If desired, an ALARM LEVEL menu button 188 can be provided to vary the level of the alarm (e.g. "High", "Medium", "Low", etc). In certain embodiments, an ALARM MODE menu button 190 can be provided to toggle the mode (e.g. "Audible Only", "Audible/Visual", "Visual Only") of the alarm, when activated.

A START RECORDING selection box 192 can be selected to activate a recording when one or more events are detected by the monitoring system. A PRE-RECORD TIME menu button 194 and RECORD TIME menu button 196 within section 184 can be provided to permit the user select the amount of time to be allocated to recording before and after the detected event. In the illustrative view depicted in FIG. 6, for example, "No Pre-recording" and "30 seconds" are shown selected using the PRE-RECORD TIME and RECORD TIME menu buttons 194,196, causing the monitoring system to record for a period of 30 seconds after the detection of an event. If the user desires to increase or decrease the time allocated for recording, or if the user desires to pre-record video prior to the occurrence of an event, the user may select menu buttons 194,196 and make the appropriate adjustments, as desired.

A RECORD FRAME RATE menu button 198 can be further provided to permit the user to adjust the frame rate of each video camera tasked by the monitoring system. If, for example, the user desires to record at a frame rate of 25 fps, the user may select "25 frames per second" or other appropriate text using the RECORD FRAME RATE menu button 198. In certain embodiments, the graphical user interface 122 can be configured to display an alphanumeric message 200 informing the user of the maximum image bandwidth to be delivered by each video camera tasked by the monitoring system. A DELETE AFTER menu button 202 can also be provided to permit the user to specify a time period (e.g. "1 day", "2 days", "1 week", "1 month", "indefinitely", etc.) in which to store the recorded video clip prior to being deleted.

A SEND VIDEO TO STATION(S) selection button 204 can be selected to output video feeds to selected stations upon the detection of an event by the monitoring system. If, for example, the user desires to output video to a particular terminal or network station, the user may select a STATION NUMBER icon button 206 on the graphical user interface 122 and then enter the particular station or stations in which to feed the video using text box 208. Alternatively, if the user desires to output video to all stations tasked to monitor a particular area, the user may select the ALL STATIONS IN AREA icon button 210 on the graphical user interface 122 and select the appropriate area (e.g. "Region A", "Zone B", etc.) using menu button 212.

In addition to setting up and requesting various user-defined actions, the appliance manager 32 can further be configured to submit a request to the host application 34 to record the detected event in the database 38. In some embodiments, for example, a list of event conditions, the object and its information related to the event, and the time and/or image frames where the event occurred can be stored in the database 38 for later use. Such indexing process marks the inputs from the DVSS's. In addition to facilitating retrieval of a particular event, such indexing process may also facilitate retrieval of other events meeting another user's search criteria. In some applications, for example, such indexing may be used to find a video clip containing an "exit" condition or other desired event condition. Using a graphical user interface having an event condition details section similar to that depicted in FIG. 6, the graphical user interface may determine the list of event conditions in which the user is searching. This list of conditions is then matched with the stored list of conditions in the database 38. Any match of the two lists dictates the location of the time and frame in which the event conditions of interest occurred, allowing the user to retrieve the desired data. In some embodiments, the host application 34 may direct the appliance manager 32 to detect all event conditions, which then uses these event conditions to index and retrieve the stored DVSS data.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A computer assisted method of detecting and analyzing events occurring within a region of interest of a video monitoring system, the method comprising the steps of:

providing a video monitoring system including a user interface having a display, the display displaying event condition details in a first portion of the display and action response details in a second portion of the display;

defining one or more user-specified events using the event condition details in the first portion of the user interface of the video monitoring system;

the video monitoring system storing the one or more user-specified events;

the video monitoring system extracting information regarding one or more objects located within the region of interest;

the video monitoring system analyzing the extracted information to detect an occurrence of one or more of the one or more user-specified events within the region of interest;

defining one or more action responses using the second portion of the user interface of the video monitoring system; and the video monitoring system performing the one or more action responses upon the detection of the occurrence of one or more of the one or more user-specified events.

2. The method of claim 1, wherein the video monitoring system comprises a video image-processing appliance manager in communication with one or more appliance modules.

3. The method of claim 2, wherein said step of extracting information regarding one or more objects located within a region of interest is accomplished using at least one of said one or more appliance modules.

4. The method of claim 2, wherein said step of extracting information regarding one or more objects located within a region of interest is accomplished using the appliance manager.

5. The method of claim 2, wherein said analyzing and performing steps are accomplished using the appliance manager.

6. The method of claim 2, wherein said step of analyzing the extracted information to detect the occurrence of the one or more user-specified events occurring within the region of interest is accomplished using an event detection module.

7. The method of claim 2, wherein said one or more appliance modules includes a video detection module, a video motion tracking module, an object classification module, and an event detection module.

8. The method of claim 2, wherein said step of performing the one or more action responses upon the detection of the one or more user-specified events includes the step of performing an action request using an action dispatcher module.

9. The method of claim 2, wherein the user interface includes a graphical user interface in communication with the appliance manager.

10. The method of claim 9, wherein said step of defining one or more user-specified events is accomplished using the graphical user interface.

11. The method of claim 1, wherein said step of analyzing the extracted information to detect the occurrence of the one or more user-specified events occurring within the region of interest includes the step of defining a set of semantic parameters describing the object's state and/or physical features relative to the region of interest.

12. The method of claim 11, wherein said step of analyzing the extracted information to detect the occurrence of the one or more user-specified events within the region of interest includes the step of comparing said set of object semantic parameters with a set of user-specified semantic parameters.

13. The method of claim 12, further comprising the video monitoring system indexing each detected event using said set of object semantic parameters.

14. The method of claim 12, wherein said step of performing an action response upon the detection of the one or more user-specified events includes the step of recording a video clip containing the event and storing the video clip within a database.

15. The method of claim 14, further comprising the step of subsequently retrieving the video clip containing the one or more user-specified events using said set of object semantic parameters.

16. The method of claim 1, wherein said step of performing an action response upon the detection of the one or more user-specified events includes the step of sending a video signal to a terminal station.

17. A computer assisted method of detecting and analyzing events occurring within a region of interest of a video monitoring system, the method comprising the steps of:

providing a modular video monitoring system comprising a video image-processing appliance manager in communication with one or more plug-in appliance modules configured to perform user-defined imaging processing functions;

initiating an algorithm or routine within the appliance manager and extracting information regarding one or more objects located within a region of interest;

the video monitoring system analyzing the extracted information to detect the occurrence of one or more user-specified events within the region of interest; and the video monitoring system performing an action response upon the detection of one or more of the user-specified events, wherein the action response includes issuing an alarm and/or initiating a recording of a video clip containing the one or more user-specified events.

18. The method of claim 17, wherein said step of extracting information regarding one or more objects located within a region of interest is accomplished using at least one of said one or more appliance modules.

19. The method of claim 17, wherein said step of extracting information regarding one or more objects located within a region of interest is accomplished using the appliance manager.

20. The method of claim 17, wherein said analyzing and performing steps are accomplished using the appliance manager.

21. The method of claim 17, wherein said step of analyzing the extracted information to detect the occurrence of the one or more user-specified events occurring within the region of interest is accomplished using an event detection module.

22. The method of claim 17, wherein said one or more appliance modules includes a video detection module, a video motion tracking module, an object classification module, and an event detection module.

23. The method of claim 17, wherein said step of performing an action response upon the detection of one or more of the user-specified events includes the step of performing an action request using an action dispatcher module.

24. The method of claim 17, wherein the video monitoring system comprises a graphical user interface in communication with the appliance manager.

25. The method of claim 24, further comprising the video monitoring system defining the one or more user-specified events using the graphical user interface.

26. The method of claim 17, wherein said step of analyzing the extracted information to detect the occurrence of the one or more user-specified events occurring within the region of interest includes the step of defining a set of semantic parameters describing the object's state and/or physical features relative to the region of interest.

27. The method of claim 26, wherein said step of analyzing the extracted information to detect the occurrence of one or more user-specified events within the region of interest includes the step of comparing said set of object semantic parameters with a set of user-specified semantic parameters.

28. The method of claim 27, further comprising the video monitoring system indexing each detected event using said set of object semantic parameters.

29. The method of claim 27, wherein said recording of a video clip containing the one or more user-specified events includes storing the video clip within a database.

30. The method of claim 29, further comprising the video monitoring system subsequently retrieving the video clip containing the one or more user-specified events using said set of object semantic parameters.

31. The method of claim 17, wherein said step of performing an action response upon the detection of one or more of the user user-specified events includes the step of sending a video signal to a terminal station.

32. A computer assisted method of detecting and analyzing events occurring within a region of interest of a video monitoring system, the method comprising the steps of:
the video monitoring system prompting a user to define one or more user-specified event for detection in a region of interest using a user interface of the video monitoring system, wherein for each user-specified event defined by the user, the user can select two or more semantic parameters using the user interface of the video monitoring system;
the video monitoring system storing a set of user-specified semantic parameters corresponding to each user-specified event;
the video monitoring system extracting information regarding one or more objects located within a region of interest;
the video monitoring system analyzing the extracted information to define a set of semantic parameters describing the object's state and/or physical features relative to the region of interest;
the video monitoring system comparing said set of object semantic parameters with the set of user-specified semantic parameters corresponding to each user-specified event; and
the video monitoring system detecting the user-specified event when at least one of the object semantic parameters matches a corresponding user-specified semantic parameter.

33. A computer assisted method of detecting and analyzing events occurring within a region of interest of a video monitoring system, the method comprising the steps of:
providing a modular video monitoring system comprising a video image-processing appliance manager in communication with one or more plug-in appliance modules and a graphical user interface;
the video monitoring system prompting a user to define one or more user-specified event for detection in the region of interest using the graphical user interface, wherein for each user-specified event defined by the user, the user can select two or more semantic parameters using the graphical user interface;
the video monitoring system monitoring the region of interest to detect the one or more user-specified event in real or near real-time; and
the video monitoring system performing an action response upon the detection of the one or more user-specified event.

34. A method of extracting object information using video image processing, the method comprising the steps of:
providing a video monitoring system that provides at least one video frame containing an object of interest;
defining at least one region of interest within the video frame;
providing a boundary box about the object of interest;
determining the location of the boundary box relative to a boundary area of the region of interest;
assigning a set of coordinates to the boundary box and the boundary area of the region of interest;
providing the video monitoring system one or more user-definable semantic parameters relating to the object of interest; and
analyzing the object of interest with the video monitoring system to detect a user-definable event when the object of interest has the one or more user-definable semantic parameters.

35. The method of claim 34, wherein said step of determining the location of the boundary box relative to a boundary area of the region of interest includes the step of:
comparing the corresponding coordinate values of the boundary box relative to the coordinate values of the boundary area.

36. The method of claim 34, wherein said boundary box is a minimum boundary rectangle.

37. A method of extracting object information using video image processing, the method comprising the steps of:
providing a video monitoring system including at least one video frame containing an object of interest;
defining at least one region of interest within the video frame;
providing a minimum boundary rectangle about the object of interest;
assigning a set of coordinates to the minimum boundary rectangle and a boundary area of the region of interest;
comparing the corresponding coordinate values of the minimum boundary rectangle relative to the coordinate values of the boundary area and determining the location of the minimum boundary rectangle relative to the boundary area;
defining one or more user-definable semantic parameters relating to the object of interest; and
analyzing the object of interest with the video monitoring system to detect a user-definable event when the object of interest has the one or more user-definable semantic parameters.

38. A video monitoring system, comprising:
a video image-processing appliance manager in communication with one or more appliance modules, said appliance manager configured to run an algorithm or routine for extracting information regarding one or more objects located within a region of interest and defining a set of semantic parameters according to one or more user-specified semantic parameters, the set of semantic parameters describing the status and/or physical state of each object relative to the region of interest; and
a graphical user interface including a first portion for configuring the one or more user-specified semantic parameters within the appliance manager and/or an event detection module and the graphical user interface includes a second portion for selecting an action response upon the detection of an event by the video monitoring system.

39. The video monitoring system of claim 38, wherein said graphical user interface includes a means for selecting a region of interest for the detection of an event.

40. The video monitoring system of claim 38, wherein said graphical user interface includes a means for selecting one or more event conditions for detection within the region of interest.

41. The video monitoring system of claim 38, wherein said means for selecting an action response upon the detection of an event by the video monitoring system includes a means for setting an alarm response.

42. The video monitoring system of claim 38, wherein said means for selecting an action response upon the detection of an event by the video monitoring system includes a means for recording a video clip.

43. The video monitoring system of claim 38, wherein said means for selecting an action response upon the detection of an event by the video monitoring system includes a means for sending video to a terminal station.

* * * * *